UNITED STATES PATENT OFFICE.

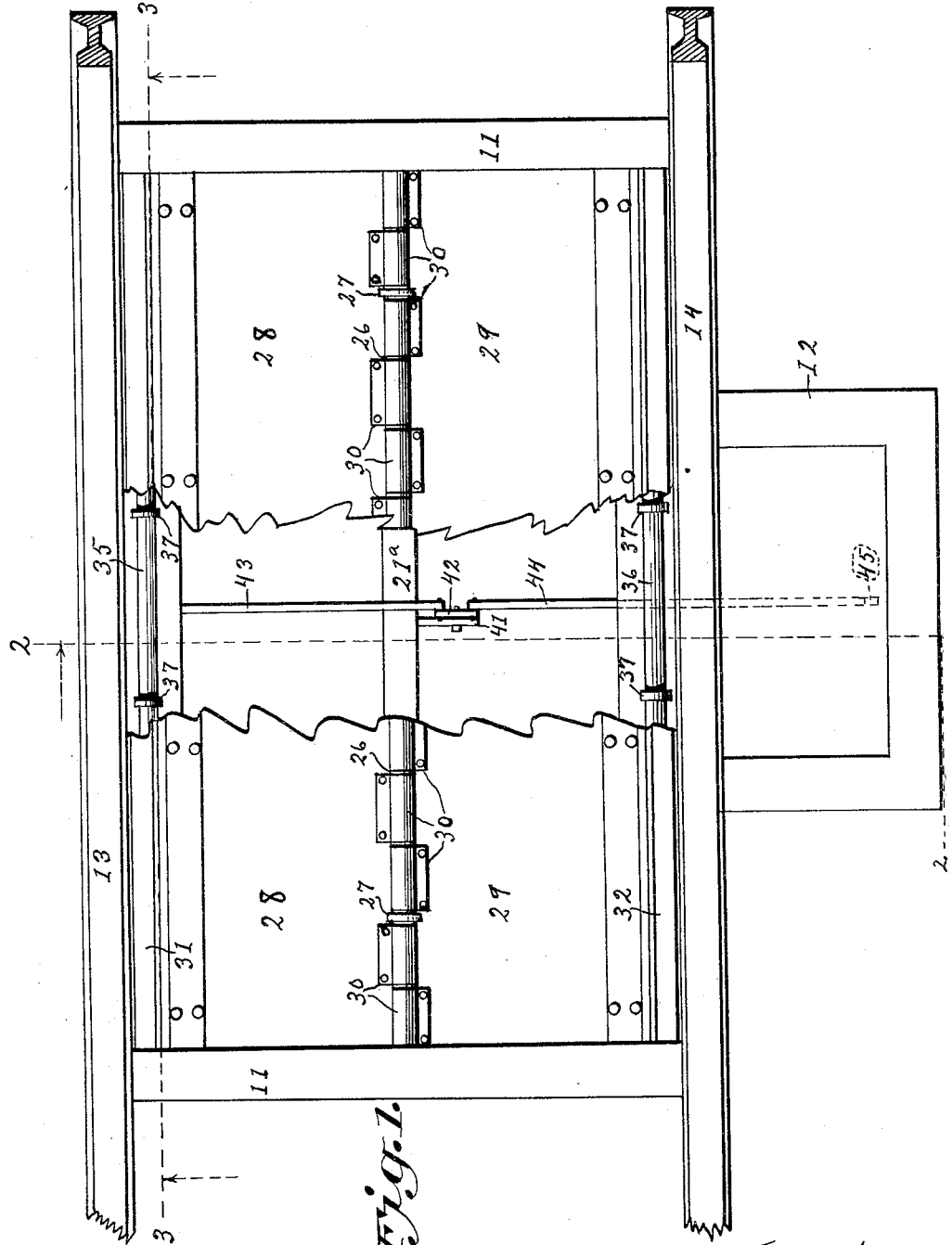

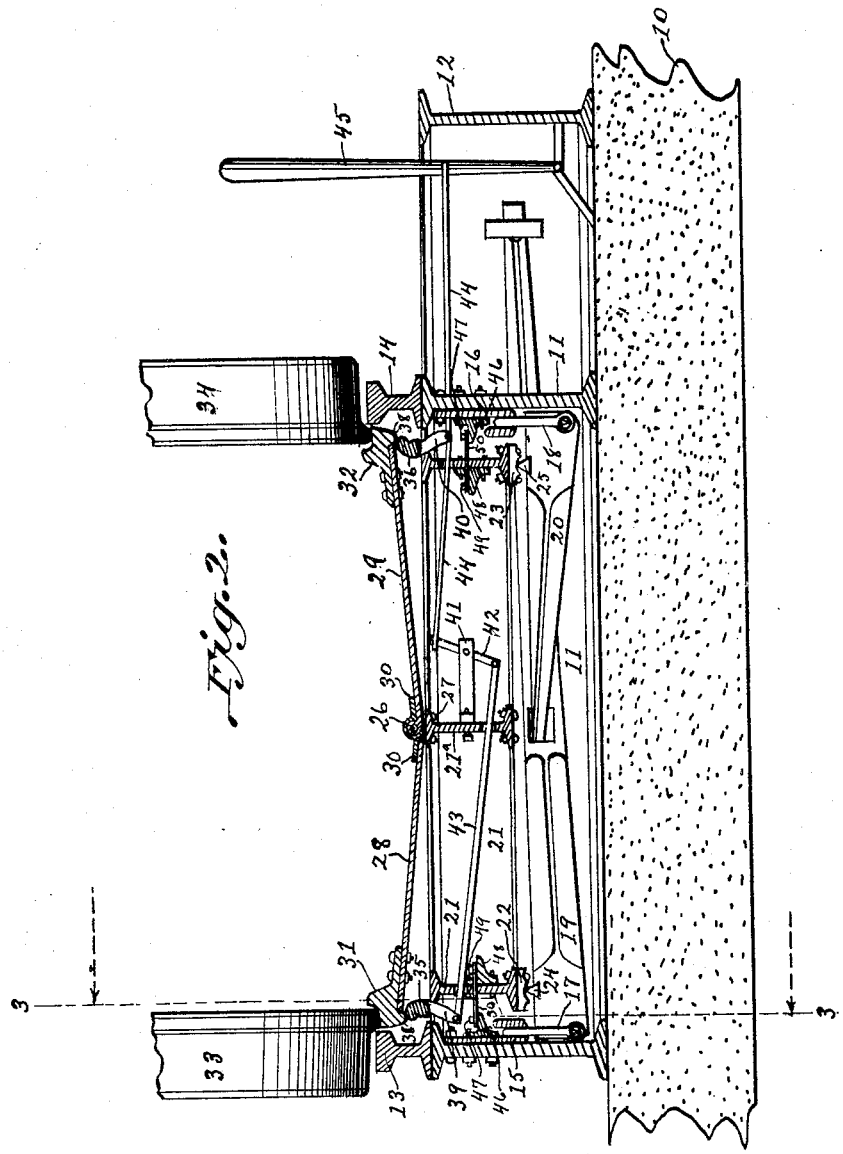

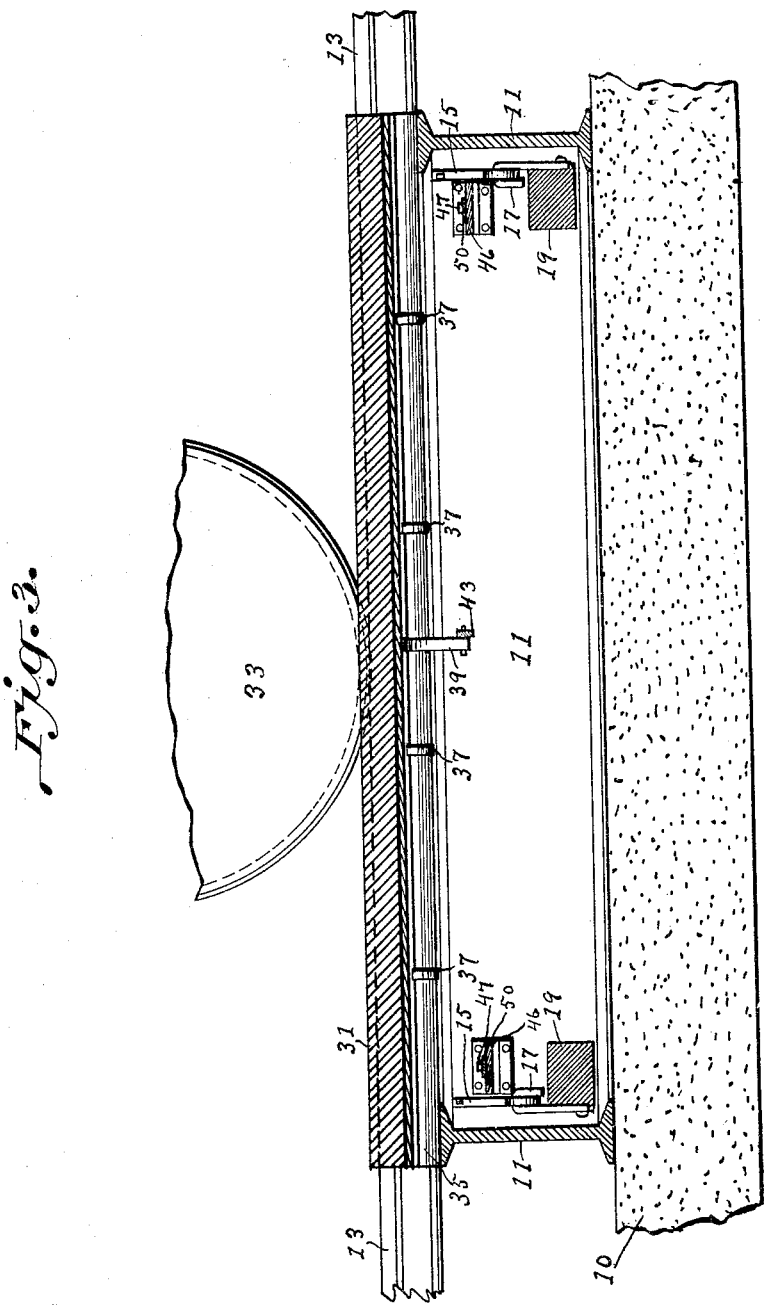

LUCIUS R. ROSEBROOK, OF OSKALOOSA, IOWA.

RAILWAY TRACK-SCALE.

1,148,991.   Specification of Letters Patent.   Patented Aug. 3, 1915.

Application filed January 31, 1914. Serial No. 815,655.

*To all whom it may concern:*

Be it known that I, LUCIUS R. ROSEBROOK, citizen of the United States of America, and resident of Oskaloosa, Mahaska county, Iowa, have invented a new and useful Railway Track-Scale, of which the following is a specification.

The object of this invention is to provide an improved relieving-gear for railway track scales.

A further object of this invention is to provide improved vertically-movable grooved rails mounted on the weighing levers and adapted to engage the flanges of car wheels for the weighing operation.

A further object of this invention is to provide improved means for moving wheel-engaging rails to operative position.

A further object of this invention is to provide improved means for supporting the main levers of a track scale.

A further object of this invention is to eliminate the scale pit.

A further object of this invention is to provide an improved cover for track scales.

A further object of this invention is to provide a relatively short scale adapted to weigh a car or other object piecemeal, one end at a time.

My invention consists in the construction, arrangement and combination of elements hereinafter set forth, pointed out in my claims and illustrated by the accompanying drawing, in which—

Figure 1 is a plan illustrating my invention, the central portion of the cover plates being broken away to reveal hidden construction. Fig. 2 is a transverse sectional elevation on the line 2—2 of Fig. 1, illustrating the device in weighing position. Fig. 3 is a longitudinal sectional elevation on the line 3—3 of Fig. 2.

In the construction of the device as shown the numeral 10 designates a solid concrete base or foundation which extends beneath the entire scale and supports the outer I-beam frame 11, which is of rectangular form.

The numeral 12 designates the beam box which is also formed of I-beams supported by the concrete base 10, and said beam box and the outer I-beam frame 11 inclose all of the weighing devices and levers of the scale.

Track rails 13, 14 of ordinary form are mounted on and secured, where they cross the scale, to the longitudinal members of the outer I-beam frame 11, and said rails are continuous from the scale to the ordinary road-bed and have no loose or free ends at the junction of the scale and road-bed. Hooks 15, 16 are mounted on and bolted to the inner sides of the longitudinal members of the outer I-beam frame 11 and pivotally support, through clevises 17, 18, the outer end portions of the main levers 19, 20.

I do not illustrate nor describe any of the weighing devices except the main levers 19, 20, as such devices form no part of my present invention, and any suitable arrangement and combination of weighing devices may be employed.

An inner I-beam frame 21 is provided and said frame is rectangular in form, of smaller dimensions than the outer frame 11 and is mounted within said frame, the beams comprising said inner frame preferably being of materially less altitude than the beams comprising the outer frame 11. The longitudinal members of the inner I-beam frame 21 are provided with bearings 22, 23 resting on knife-edges 24, 25 carried by the main levers 19, 20. The inner I-beam frame 21 is formed with a central longitudinal member 21ª on top of which is mounted a pintle rod 26 which extends longitudinally of and is secured to said central member by means of clips or U-bolts 27. Cover plates 28, 29 are formed with hinge members 30 loosely embracing the pintle rod 26, and said cover plates conjunctively cover the entire space inclosed by the outer I-beam frame 11. Grooved rails 31, 32 are fixed to the outer margins of the cover plates 28, 29 respectively and extend longitudinally of the scale just inside of the track rails 13, 14. Cam-shaped bars 35, 36 are mounted beneath the grooved rails 31, 32 and preferably extend approximately the entire length of said rails. The cam bars 35, 36 are formed circular in cross-section at desired intervals and clips or bearings 37 engage such portions of the bars and are secured to the tops of the longitudinal members of the inner I-beam frame 21, whereby said cam bars are rotatively secured to said I-beams. When the grooved rails 31, 32 are in lowermost position, the cam bars rest on the base flanges of the rails 13, 14 and the grooved rails rest immediately above them, and together with the cover plates 27, 28 form a complete cover for the outer I-beam frame 11 and prevent the passage of dirt and other foreign substances to the interior of the space inclosed by said frame and containing the weighing levers. When in elevated position the grooved rails 31, 32 are adapted to receive the flanges of car wheels such as 33, 34 and raise said wheels clear of the track rails 13, 14, as shown in Fig. 2. Each grooved rail 31, 32 is formed with a nose 38 on its lower face adapted to be engaged by a cam bar 35 or 36 for the purpose of elevating said grooved rails and oscillating the cover plates 27, 28 on the pintle rod 26 at times in order to bring the device to weighing position.

Arms 39, 40 are formed on and extend downwardly from the cam bars 35, 36 between the I-beam frames 11 and 21. A bracket 41 is fixed to and extends laterally from the central portion of the central I-beam 21$^a$, and a lever 42 is fulcrumed at its center on said bracket. A link 43 is pivotally connected at one end to the lower end portion of the lever 42, extends loosely through an aperture in the I-beam 21$^a$ and through an aperture in the longitudinal member at one side of the inner I-beam frame 21, and is pivotally connected at its opposite end to the lower end portion of the arm 39. A link 44 is pivotally connected at one end to the upper end portion of the lever 42, passes freely through an aperture in the opposite side of the inner I-beam frame 21, is pivotally connected intermediate of its ends to the arm 40, passes freely through an aperture in the outer I-beam frame 11, and is pivotally connected at its opposite end to a hand lever 45 fulcrumed within the beam box 12. By means of the lever 45 the cam bars 35 (through the link 44, lever 42, link 43 and arm 39) and 36 (through the link 44 and arm 40) are oscillated to the end of raising the grooved rails 31, 32 into position for receiving a load and weighing the same, or to the end of lowering said grooved rails out of operative position. The points of attachment of the links 43, 44 to the lever 42 are equidistant from the fulcrum thereof, so that equal movement is imparted to both arms 39, 40 and cam bars 35, 36. When a load rests on the grooved rails 31, 32 the weight is borne through said rails to the cam bars 35, 36, I-beam frame 21, bearings 22, 23 and knife-edges 24, 25 to the main levers 19, 20 to the end of weighing such load in the ordinary manner. When it is desired to pass a load over the scale without weighing the same, the grooved rails 31, 32, which are normally in lowered position, are not encountered at all by the car wheels and the scale is not affected by the passing of such load. This makes for reliability, accuracy and longevity of the scale, as the strain thereon is reduced to a minimum.

The outer I-beam frame 11 is the only pit required for the scale, and very little if any excavation is necessary for the placing thereof. The main levers are suspended from the outer I-beam frame, the same support which carries the track rails, whereby the proper relation of the different parts of the device is always maintained, regardless of any shifting or heaving due to the action of the elements. The grooved shape of the scale rails is advantageous in that it controls the safe travel of the car wheels and prevents any possibility of derailing. When it is desired to clean or repair the scale, either or both of the cover plates 27, 28 may be oscillated to such extent as to permit entrance to the space inclosed by the I-beam frame 11.

It is desirable to provide means to prevent undue oscillation of the inner I-beam frame 21 and devices carried thereby. To this end I have provided brackets 46 fixed at intervals to and extending inwardly from the outer I-beam frame 11 and formed with upstanding studs 47. Similar brackets 48, formed with upstanding studs 49, are fixed to the inner I-beam frame 21 contiguous to the brackets 46. Stay-rods 50, formed with eyes at each end to engage the studs 47, 49 loosely, are provided and tend to prevent undue lateral and longitudinal oscillation of the inner I-beam frame relative to the outer, at the same time permitting vertical movement of the inner I-beam frame 21. Where the brackets 48 are fixed to the inner side of the I-beam frame 21, as illustrated, the stay-rods 50 pass loosely through apertures in said I-beam frame.

It is to be understood that my improved scale may be made of any desired length, such as ordinary scales, but I prefer to make it much shorter, say not more than ten feet in length.

By the use of this scale, it is possible to obtain the accurate weight of an object, such as a railway car, by weighing one set of trucks at a time and combining the results so obtained to secure the entire weight. This will procure accurate results provided care is taken to have the railway track adjacent the scale on a straight gradient, so that the object being weighed will stand approximately horizontal. By this means of weighing, which I have demonstrated to be exact, the scale can be made only about one-fourth the length of the ordinary scale, and is consequently much cheaper in construction. The scales can be much more widely used, as many who are now required to do without them can avail themselves of accurate track scales, thus saving them considerable time and money.

The combination cover plates with the grooved rails keep out the dirt and further keep the scales from gathering moisture. This is important in keeping the scales in perfect balance as against rainy weather, when there is apt to be considerable variation by reason of the collection of water.

The short scales above described may also be built in pairs and spaced apart on the track to correspond to the spacing of sets of trucks of cars to be weighed. In this manner both sets of trucks may be weighed together, while the actual length of the scale is reduced about one-half. The advantage would be that they would be pitless and would be stronger, more accurate and much cheaper than the present long scale.

I claim as my invention—

1. A railway track scale, comprising an outer frame, track rails mounted upon and crossing said frame, main levers suspended from and within said outer frame, an inner frame resting on said main levers and within said outer frame, grooved rails mounted for vertical oscillation upon said inner frame and between said track rails, and means for vertically oscillating said grooved rails.

2. A railway track scale, comprising an outer frame, track rails mounted upon and crossing said frame, main levers suspended from and within said outer frame, an inner frame resting on said main levers and within said outer frame, grooved rails mounted for vertical oscillation upon said inner frame, and means for oscillating said grooved rails simultaneously.

3. A railway track scale, comprising an outer frame, track rails mounted upon and crossing said frame, main levers suspended from and within said outer frame, an inner frame resting on said main levers, grooved rails mounted for oscillation upon said inner frame, and cam devices adapted to engage and elevate said grooved rails at times.

4. A railway track scale, comprising an outer frame, track rails mounted upon and crossing said frame, main levers suspended from and within said outer frame, an inner frame resting on said main levers, grooved rails mounted for oscillation upon said inner frame, cam devices adapted to engage and elevate said grooved rails at times, and lever-operated means for oscillating said cam devices simultaneously.

5. A railway track scale, comprising an outer frame, track rails mounted upon and crossing said frame, main levers suspended from and within said outer frame, an inner frame resting on said main levers, cover plates hinged on the median line of said inner frame and covering the space inclosed by said outer frame, grooved rails on margins of said cover plates parallel with said track rails, and means for elevating outer margins of said cover plates and said grooved rails.

6. A railway track scale, comprising an outer I-beam frame, track rails mounted upon and crossing said outer frame, hooks on inner faces of said outer frame, main levers formed with clevises suspended from said hooks, an inner I-beam frame resting on said main levers and within said outer frame, the tops of said frames being approximately on the same level, said inner frame being formed with a central longitudinal member, cover plates hinged to said central member and covering the space inclosed by said outer frame, grooved rails mounted on outer margins of said cover plates, and means for simultaneously elevating outer margins of said cover plates.

7. A railway track scale, comprising a solid base, an outer I-beam frame mounted thereon, a beam frame adjoining said outer frame and resting on said base, weighing devices contained within said outer frame and beam frame, an inner I-beam frame resting on said weighing devices, and grooved rails mounted for oscillation and vertical adjustment on said inner frame.

8. A railway track scale, comprising an outer I-beam frame, track rails mounted on and crossing said outer frame, main levers suspended from and within said frame, an inner I-beam frame resting on said main levers, grooved rails mounted for oscillation and vertical adjustment on said inner frame, means for simultaneously oscillating said grooved rails, and stay-rods pivotally connecting said inner and outer frames.

9. A railway track scale, comprising an outer frame, track rails mounted on and crossing said outer frame, main levers suspended from and within said outer frame, an inner frame resting on said main levers, cover plates hinged on the median line of said inner frame, grooved rails mounted on outer margins of said cover plates, cam bars mounted for oscillation on said inner frame and adapted to engage beneath and oscillate said grooved rails, arms on said cam bars, a lever mounted for oscillation, and pivotal connections between said arms and lever.

Signed by me at Oskaloosa, Iowa, this 30th day of September, 1913.

LUCIUS R. ROSEBROOK.

Witnesses:
 John N. McCoy,
 H. B. McCoy.